Oct. 21, 1958   C. K. STILLWAGON   2,856,952
VALVE
Filed May 4, 1956   3 Sheets-Sheet 1
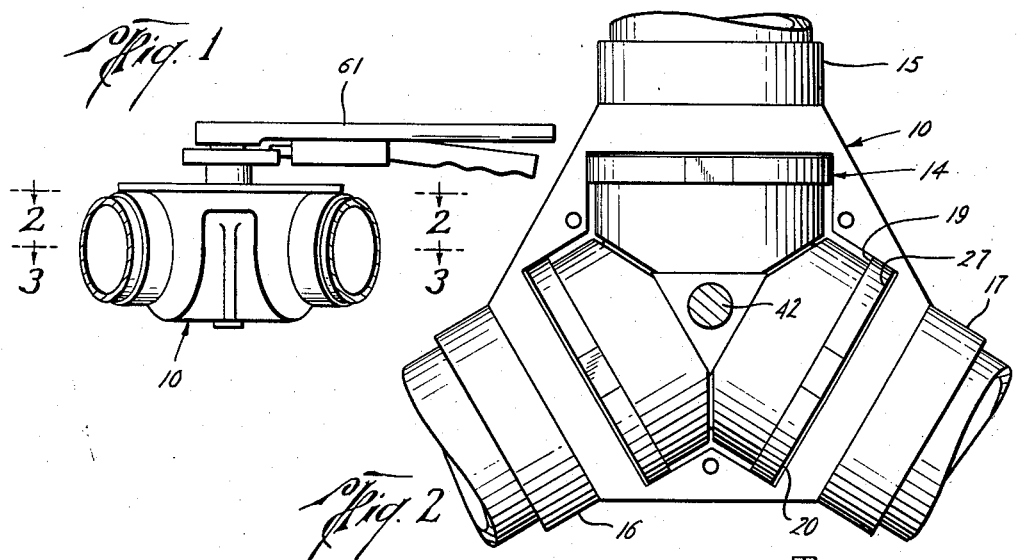
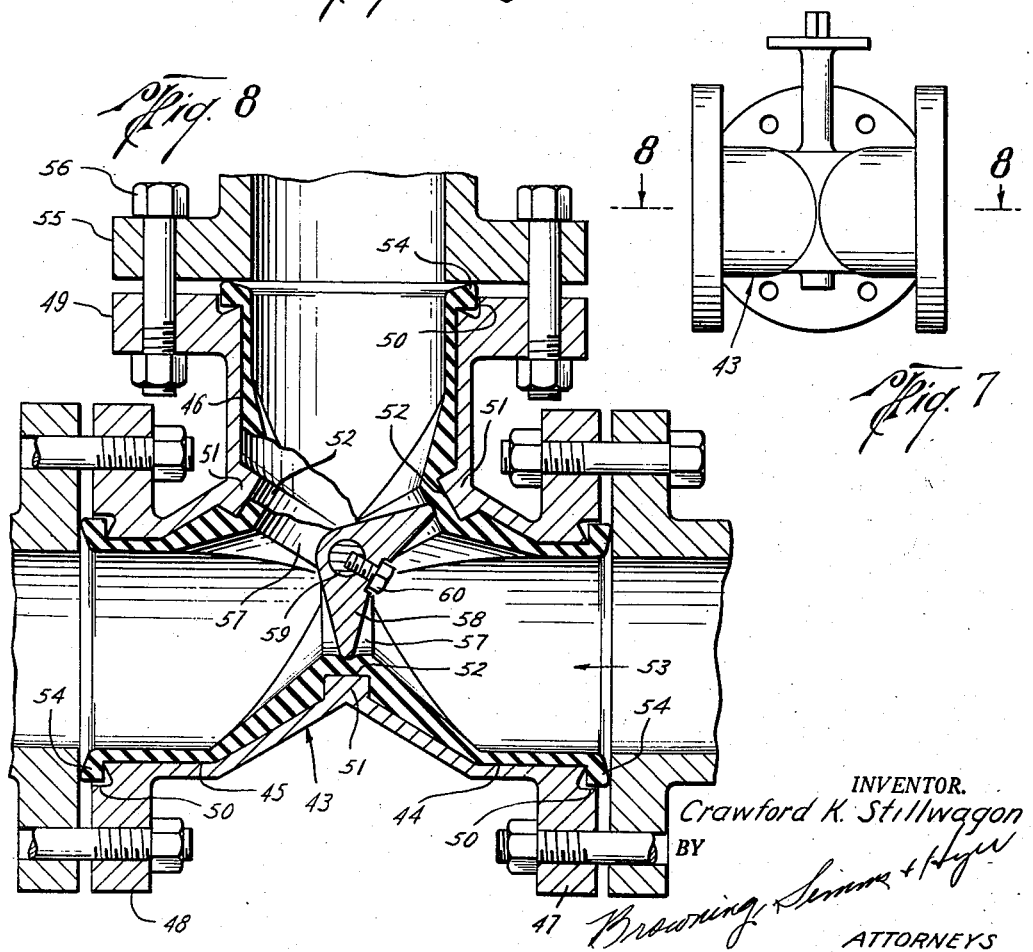
INVENTOR.
Crawford K. Stillwagon
BY
ATTORNEYS

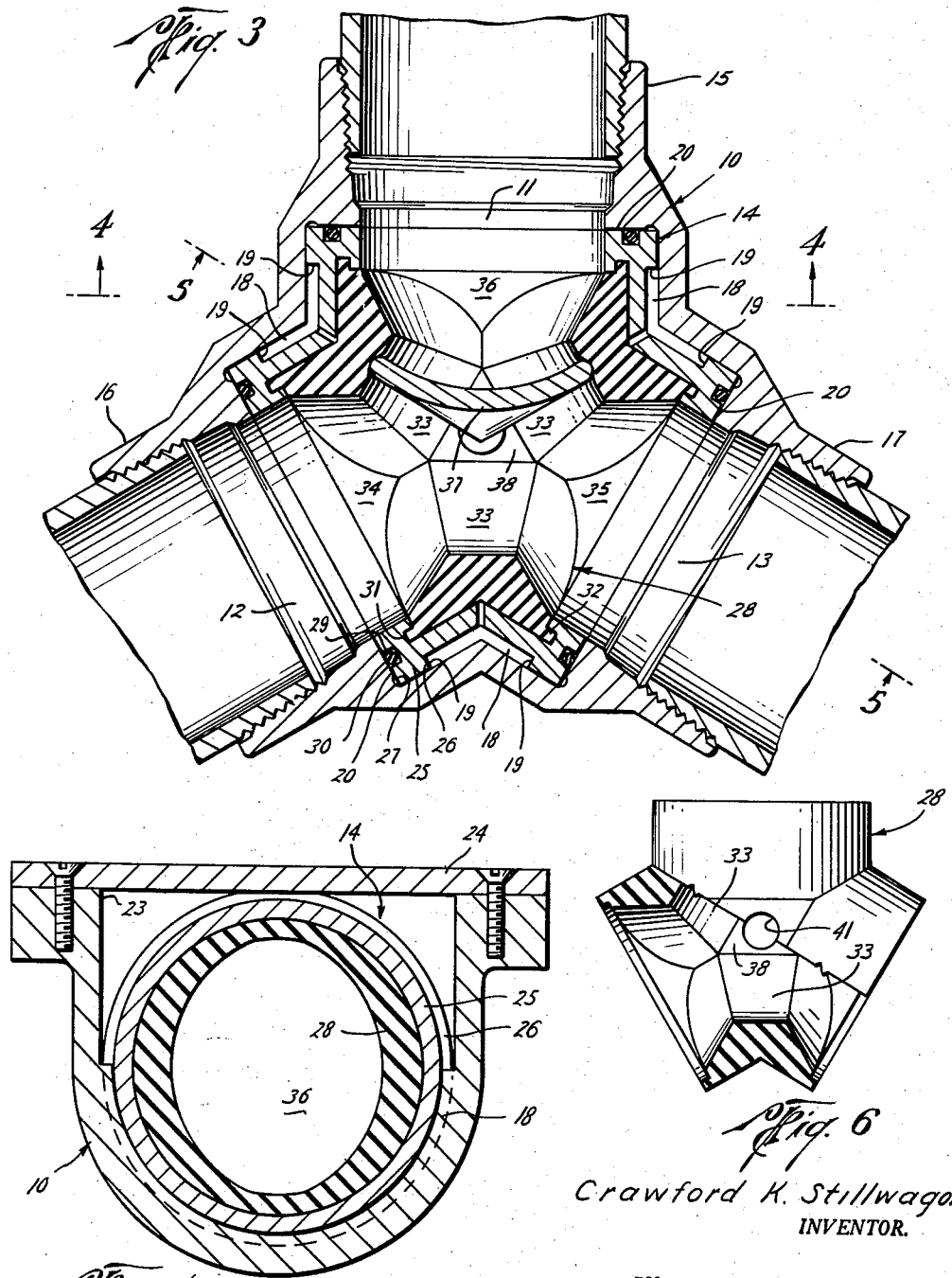

Oct. 21, 1958
C. K. STILLWAGON
2,856,952
VALVE
Filed May 4, 1956
3 Sheets-Sheet 3
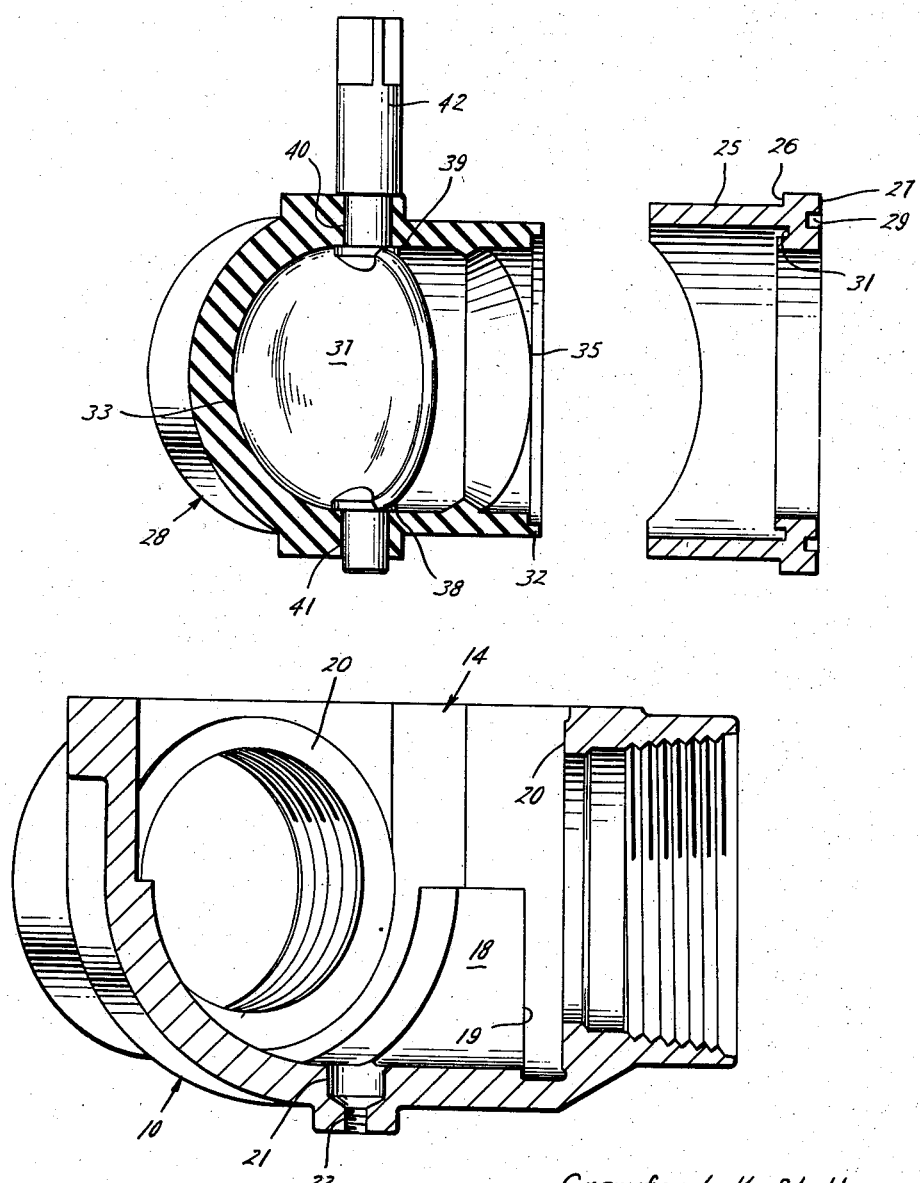
Crawford K. Stillwagon
INVENTOR.
BY
ATTORNEYS United States Patent Office 2,856,952
Patented Oct. 21, 1958

2,856,952
VALVE
Crawford K. Stillwagon, Houston, Tex.
Application May 4, 1956, Serial No. 582,818
10 Claims. (Cl. 137—454.6)

This invention relates to valves for interconnecting three or more pipes. In one important aspect it relates to valves having at least three ways in which the seat is formed of resilient material. In another important aspect it relates to valves having at least three ways in which the valve seat and valve member are removable through a side door for cleaning or repairing without removing the valve body from the lines which it controls.

Valves of three or more ways are widely used. Two-way valves having resilient seats are widely used in low pressure service. So far as is known, no one has taught the use of a resilient seat in a valve of three or more ways. Therefore, a general object of this invention is to provide a valve having three or more ways with a resilient type of seat.

In many industries, it is desirable to be able to frequently dismantle and reassemble a valve in minimum time. For instance, in continuously operating plants, the entire plant is shutdown at intervals for overhaul. In such plants, valve downtime for disassembly, inspection and reassembly with new parts where necessary is an important factor. In the food processing and certain chemical industries, valves must be frequently dismantled for cleaning. Valves for use in such industries have the further requirement that the fluid controlled not be allowed to leave the fluid passageways and stand in crevices or cracks any more than absolutely necessary due to bacteria formation, etc.

It is a further object to provide a valve having at least three ways which may be disassembled, cleaned, and reassembled with new parts where necessary in minimum time.

Another object is to provide a valve having at least three ways in which the valve member and seat may be removed from the valve body without removing the valve body from the lines it controls.

Another object is to provide a valve having at least three ways in which the valve member and seat may be removed from the valve body without removing the valve body from the lines it controls, and in which controlled fluid is confined to the flow passageways through the valve and seat therein.

Another object is to provide a valve as in the preceding object in which the seat is formed of resilient material.

Another object is to provide a valve having at least three ways in which the valve body is a one-piece structure and the seat is formed of resilient material.

Another object is to provide a valve having at least three ways controlled by a resilient seat and disc-type valve member in which the seal surfaces of the seat are noncircular in a plane normal to the rotational axis of the disc to provide maximum opening from the seat into each line controlled.

Another object is to provide a valve having at least three ways and a side door through which a resilient seat and valve member may be inserted and removed in which a retainer positions and supports the seat in a cavity in the valve body and seals the fluid openings in the seat to the ways in the body.

Another object is to provide a valve as in the preceding object in which the retainer is in several pieces to provide for ease of manufacture and assembly.

Other objects, features and advantages of this invention will appear from a consideration of the drawings, the specification and the appended claims.

Broadly, my invention may take two basic forms; that is, the form of a unitary one-piece body or the form of a two-piece body. In the latter case, one piece provides what might be called the body of the valve and the second piece is a cover plate covering a side door through which access to the interior of the valve body is provided.

In the one-piece body form of valve, the seat is provided by a resilient member which preferably lines all passageways through the body. It is preferred that the valve seat be formed by arcuate surfaces positioned between each pair of passageways through the body. When this type of seat is used, a butterfly valve member controls flow through the seat. These arcs are preferably segments of a cylinder so as to provide large openings into the seat.

The unitary body valve is relatively inexpensive to make and is highly advantageous in cases where the fluid controlled is corrosive to metal and the insert can be fabricated of material which is inert to such fluid.

On the other hand, the one-piece body form of this invention cannot be removed from a line, cleaned and reassembled as quickly as desired. In service where the valve must be dismantled frequently, a valve body having a side door through which the valve seat and valve member may be inserted is preferred. In this form of the invention, it is possible to use a one-piece valve and stem which reduces possibility of leakage through the valve. In the side door form of my invention, the valve seat may be fabricated to fit snugly within the cavity within the valve body. However, it is preferred, for ease of manufacture and assembly, that the seat be provided with a retainer which supports the seat and seals the several branches or outlets of the seat to the several passageways of the valve body. The relationship of the valve member, seat and retainer is such that they slide into and out of the cavity as a unit. Once in place in the cavity, all seals are perfected.

Referring now to the drawings wherein there is shown by way of illustration a form of my invention in a one-piece body and a form of my invention in a body having a side opening, and wherein like reference numerals indicate like parts:

Fig. 1 is a view in vertical elevation of a valve of the type having a side door constructed in accordance with my invention;

Fig. 2 is a top plan view on an enlarged scale of the valve of Fig. 1 with the side door cover removed taken along the lines of 2—2 of Fig. 1;

Fig. 3 is a view in horizontal cross section through the valve of Fig. 1 on an enlarged scale along the lines 3—3 of Fig. 1;

Fig. 4 is a view taken along the lines 4—4 of Fig. 3;

Fig. 5 is an exploded view in vertical section along the lines 5—5 of Fig. 4;

Fig. 6 is a top plan view of the seat utilized in the valve of Fig. 1 with a portion shown in horizontal cross section;

Fig. 7 is a view in vertical elevation of the one-piece body form of this invention, and Fig. 8 is a view in cross section through the valve of Fig. 7 along the lines 8—8 on an enlarged scale.

Referring first to the form of valve shown in Figs. 1 through 6, a valve body indicated generally at 10 contains the seat and valve member and provides for communication between the several lines to be controlled. The body in this case has three passageways 11, 12 and 13 which provide for communication between a central cavity in the body indicated generally at 14 and threaded end fittings 15, 16 and 17 respectively. While threaded end fittings are shown as outlets for the passageways, it will be understood that welded end fittings or flange fittings might be used to secure the valve to the lines to be controlled.

The cavity 14 occupies substantially all of the central portion of the valve body and is of generally circular form below the midpoint of the valve body to support a circular form retainer as will appear hereinafter. Above the midpoint of the body, the walls of the cavity are nonconverging in an upward direction and are preferably straight as shown to permit the insertion of the retainer into the cavity.

A land 18 is provided between each fluid passageway. Each land 18 has abutment faces 19 facing in the direction of the outlets between which the land is disposed to hold the retainer sections against the surface or wall 20 of the cavity which immediately surrounds the passageway. Lands 18 extend from the bottom of the cavity upwardly to approximately the middle of the body and will engage the sections of the retainer over a like distance. As it is desired to perfect a seal against the wall sections 20 of the cavity, these surfaces are raised slightly from the remainder of the cavity wall to permit them to be easily polished.

At a centrally located point in the bottom of the cavity, there is provided a journal 21 for the valve stem. The end wall of journal 21 is threaded as shown at 22 to receive a jack screw (not shown) for applying a longitudinal force to the valve stem to lift the stem, seat, and retainer out of the cavity.

The side door opening 23 into cavity 14 is provided with a cover plate 24 which holds the valve seat, retainer, and valve member in position. It will be understood that since the cover plate 24 performs no sealing function it serves as a structural retainer and the term "cover" as used in this specification and the appended claims should not be taken as implying a closure except to the extent necessary to perform this retaining function.

The seat retainer means is preferably provided by a plurality of retainer sections 25, one for each branch or outlet of the seat. Each section is generally tubular in configuration and has a flanged portion at one end. The flange portion has one face 26 in abutment with face 19 on the shoulder 18 below the midpoint of the valve body and another face 27 in abutment with the wall portion 20 of the cavity. The dimensioning of the parts provides for a tight frictional fit for the retainer section between shoulder 19 and wall 20.

The flange portion of the retainer section is provided with a groove 29 opening into the face 27 of the flange and an O-ring 30 in this groove seals between the retainer and the wall of the cavity to confine flow of fluid to the passageways and the interior of the retainer means.

Each retainer section 25 has a portion extending from the flange portion toward the center of the cavity and surrounding a portion of seat 28 to provide support therefor. This centrally extending portion of each retainer section preferably stops short of abutment with the other retainer sections. Thus, machining to close tolerance is avoided. However, by having the retainer sections closely adjacent each other, substantially full support for the seat is obtained. The centrally positioned ends of sections 25 have quarter moons cut in opposite sides to permit the sections to terminate close to each other and provide substantially full support for the seat.

One of the primary functions of the retainer is to seal between each passageway in the body 10 and the seat. To this end, the O-ring seals 30 are provided, and a mating tongue and groove in the seat and each retainer section respectively seals therebetween. A groove 31 is cut into the face of the flange portion of each retainer section. This groove confronts the seat about an outlet thereof. The seat about each outlet is provided with an annular end wise facing protrusion 32 which is slightly larger than groove 31 so as to be held under compression when forced into the groove to provide a seal therewith. The sealing protrusion 32 should have a radial thickness dimension greater than groove 31 to provide initial interference therewith. It is also preferably under endwise compression to insure such interference.

From the above, it will be seen that each retainer section is in effect an extension of the passageway with which it is associated and seals the seat to the passageway to confine fluid flow to the interior of the passageway and the seat.

The seat includes a seal portion provided in part by a plurality of seat surfaces in the form of lands 33, one between each pair of outlets or branches 34, 35 and 36 which communicate with passageways 11, 12 and 13 of the valve body respectively. The land 33 between any two outlets is arcuate in planes normal to the path of flow past the land between said two outlets. Each of the lands 33 is preferably in the form of a segment of a cylinder. One of the planes normal to the flow past each land intersects a plane similarly normal to the flow past each of the other lands in a common line which forms a central axis. In such plane the surface of the land is closer to the central axis than at any other position along any direct path of flow past the land between the adjacent outlets. The interior of the lands or seat surfaces 33 face this common central axis which axis is the axis of rotation of a valve member, preferably a disc type valve member 37. Valve member 37 has arcuate seating edges spaced to engage two lands simultaneously and each edge is of a distance from the common axis at any given point such that when swung into coincidence with any of said three planes intersecting in the common axis, the edge will indent or be embedded in the surface of the corresponding land throughout its length. The seat is made of relatively soft resilient material preferably rubber, or synthetic rubber, so that the valve member may be embedded therein to form a seal therewith. The valve disc 37 need dig into the seat a maximum distance only in its position to fully close off one of the passageways. Thus, seal surfaces 33 may be straight in a direction parallel to the flow past them so that they will be barely engaged by the disc as it first comes in contact with an arc of the seal surface in the central portion of the arc. The distance which the disc digs into the seal will increase to the central point or half way across the arc. Further rotation of the disc will progressively decrease the distance to which the disc is embedded in the central portion of the arc. Thus, the seal surfaces 33 may be utilized without any loss in sealing capacity of the seat while providing the advantage of a much larger opening into the several passageways of the valve than would be the case if the arcs of the seal surface were circular or concave in both directions. This type of seal surface will result in minimum wear as the disc digs into the seat gradually. Less torque will be required to rotate the valve member 37.

The lands 33 terminate in flat surfaces 38 and 39 in the bottom and top of the seat respectively. Holes 40 and 41 are provided in the seat and pass through these flats and are adapted to receive the valve stem of the disc valve 37.

The valve member preferably employed is a curved disc type valve member 37 carried by a valve stem 42. The stem is mounted for rotation in holes 40 and 41. As best shown in Fig. 5, the valve stem and valve disc are preferably a unitary one-piece structure which minimizes chances of leakage through the valve so long as the seat is in good condition. The surfaces of the seat providing holes 40 and 41 through the seat act as seal surfaces to prevent leakage along the valve stem and as journals for journaling the valve stem for rotation in the valve seat. The journal 21 in the bottom of the valve body receives the lower end of the valve stem and assists in maintaining the valve stem in alignment. The valve member 37 maintains flats 38 and 39 under compression to seal about this portion of the valve member.

It will be appreciated that while other types of valve members might be used, as for instance a plug valve member, the disc or butterfly valve is preferred as it will give maximum flow through a valve seat of a given size. There will further be less torque necessary to rotate the valve and less wear on the valve seat.

To assemble the valve, the one-piece valve disc and stem is first positioned in the seat. This is accomplished by distorting the seat and forcing the valve stem into its assembled position. The further assembly of the valve is quite simple due to the face that the seat and retainer sections all fit together with interlocking parts which are engaged upon movement of the retainer sections centrally over the branches of the seat. All of the retainer sections are placed about the branches of the seat and the seal portions 32 of the ends of the branches of the seat forced into grooves 31 within the retainer sections so as to provide seals therebetween. O-rings 30 are positioned in grooves 29 and then the entire assembly forced down into the cavity 24.

As the assembly is moved down into the cavity, the flange portions of the retainer sections will come into engagement with the lands 18 which will hold the surfaces 27 of the seat sections in abutment with the wall of the cavity about each passageway through the valve body so that O-rings 30 will seal therebetween. The lands 18 provide a cradle for the retainer sections and the entire assembly is moved downwardly until the retainer sections are resting upon the land 18. The cover may then be placed over the side door opening and screwed into place to hold the retainer sections and, hence, the seat in the cavity. Note Fig. 4 which shows the plate 24 to be in abutment with the retainer.

The size of the seat is such that with the retainer sections in abutment with walls 20 of the cavity within the valve body, the seat is under compression so that the flange portions 32 of the ends of each of the seat branches will remain in sealing engagement with the grooves 31 in the seat sections.

A handle of any desired type such as the handle indicated generally at 61 may then be secured to the valve stem to provide suitable leverage for actuating the valve member.

It will be appreciated that with this form of the invention, the inspection, cleaning and repair of the valve only requires the removal of the handle and cover plate 24 before the entire valve, seat, retainer, and the valve disc assembly can be jacked out of the cavity by a jack screw in the threaded opening 22.

After the assembly has been removed from the cavity of the valve body, the O-rings may be removed, the retainer rings may be moved endwise out of engagement with the seat, the seat distorted and the valve member removed. The several parts of the valve may then be cleaned and any worn parts replaced after which the valve is reassembled in the manner explained hereinabove.

Referring now to Figs. 7 and 8, it will be noted that the valve body indicated generally at 43 is in the form of a T fitting and it is contemplated that the valve may be fabricated from a T forging or casting blank. If the forging or casting procedures and instrumentalities are such as to provide as near as possible the desired form, there will be little machining necessary other than to remove webs of material left between the dies in the forging process, etc. The body 43 has three intercommunicating passageways 44, 45 and 46 each of which terminates in a flange fitting 47, 48 and 49 respectively. Each flange fitting is provided with a groove 50 which opens into the passageway and into the abutment face of the flange.

Between each pair of passageways of the valve body and in the central cavity formed by the juncture of the three passageways, there is positioned a land 51. The confronting faces 52 of the several lands are formed in arcs. The interior of the arcs preferably face a common central axis. The lands gradually reduce in height from a point centrally of each land to the ends of the arc where they fade into the contour of the cavity.

A seat indicated generally at 53 is molded to conform to the interior configuration of body 43 and is of fairly thin wall construction to permit its distortion so that it may be inserted through one of the passageways of the valve body. The seat includes a branch extending into each of the passageways of the body and preferably to the exterior of the body.

Each branch of the seat is provided at its end with an outturned flange portion 54 of slightly greater volume than the volume of groove 50. Thus, when the flange fitting 55 of a pipe to which the valve is to be connected is drawn up tight against the flange fitting of the valve by the nuts and bolts indicated generally at 56, the flange 54 of the seat will be placed under compression within groove 50 to provide a seal between the seat and the flange fitting 55.

The seat 53 is provided with a seal portion in the form of a land 57 between each pair of branches of the seat. Lands 57 are of substantially the same form, arrangement and function as the lands 33 of Fig. 3. A disc type valve member 58 is mounted for rotation about the axis. The seal portions 57 are, as in the case of the other form of valve, segments of a cylinder to provide for maximum opening between the seal portions 57 for a given size valve. The outer periphery of the seat is contoured to conform to lands 51 so that the lands 51 and the seat 53 provides a tongue and groove arrangement which begins at both ends of the arcs of seal portions 57 and increases in depth toward the midpoint of the arc. This construction provides for better anchorage for the seat and prevents elongation of the seat due to pressure developed within the valve.

Valve stem 59 is mounted for rotation in suitable journals (not shown) within the body and the disc 55 is secured thereto by screws 60.

In assembling this form of valve, the seat 53 is distorted and two branches inserted through one of the passageways of the valve body until they pass the lands 51 and move out into their proper positions within the other two passageways of the body. The disc is then placed in position within the seat and the valve stem inserted through the disc and secured thereto by the screws 60. The valve may then be flanged to the pipes which it is to control with bolts and nuts 58.

From the above, it will be seen that the objects of this invention have been obtained. There has been provided a valve having at least three ways which utilizes a resilient seat to effect a seal. This feature has been provided both with a one-piece valve body and with a multiple-piece valve body. In the latter case, the valve member, seat retainer means, etc. are laterally removable through a side door in the body to permit cleaning and repairing of the parts of the valve without removing the valve body from the line. In this form of valve, a novel retainer means has been provided which supports the seat within the valve body and seals the ends of each branch of the seat to the passageways in the body. It is pointed out that while the retainer could be dispensed with and the cavity and top therefor contoured to support the seat, it would be difficult to effect a good seal of the type shown between the ends of each branch of the seat and the passageways as this would require compression and distortion of the seat. While other types of seals might be used, the seal shown is preferred. The resilient material from which the seat is fabricated is sufficiently rigid that this distortion would be difficult and after the valve body is made up in the line, it would not be known whether a complete seal had been obtained between the seat and the cavity until the valve had been placed on service and inspected for leaks. For this reason, it is preferred to use the retainer which provides a positive seal without distortion and manipulation of the liner other than the slight compression as the retainer sections are moved toward each other and inserted in the cavity 14.

There has also been provided in the one-piece body form of valve a very simple, inexpensive apparatus which not only provides advantages of a resilient seat, but also may be utilized to protect the valve body from contact with controlled fluid, and therefore, this form is very advantageous where the valve body is not inert to the controlled fluid.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve comprising, a body having a cavity therein, at least three passageways interconnecting the cavity and the exterior of the body, a resilient seat in the cavity having a branch communicating with each passageway and conducting fluid between the passageways, seat retainer means surrounding the seat and abutting the wall of the cavity about each of said passageways, means sealing the end of each branch of the seat to the retainer means, seal means between the retainer means and the cavity wall about each of the passageway openings into the cavity, a valve member controlling flow through the seat, a side door opening into the cavity through which the seat, retainer means and valve member may be inserted and removed, and a cover for the side door maintaining the seat, retainer means, and valve member in the cavity.

2. A valve comprising, a body having a cavity therein, at least three passageways interconnecting the cavity and the exterior of the body, a resilient seat in the cavity having a branch communicating with each passageway and conducting fluid between the passageways, seat retainer means provided by separate retainer sections surrounding each seat branch and abutting the wall of the cavity about each passageway opening into the cavity, means sealing the end of each branch of the seat to the surrounding retainer section, seal means between the retainer sections and the cavity wall about each of the passageway openings into the cavity, means maintaining each retainer section in abutment with the cavity wall, a valve member controlling flow through the seat, a side door opening into the cavity through which the liner, retainer means and valve member may be inserted and removed, and a cover for the side door maintaining the liner, retainer, and valve member in the cavity.

3. A valve comprising, a body having a cavity therein, at least three passageways interconnecting the cavity and the exterior of the body, a resilient seat in the cavity having a branch communicating with each passageway and conducting fluid between the passageways, seat retainer means provided by separate retainer sections surrounding each seat branch and abutting the wall of the cavity about each passageway opening into the cavity, means sealing the end of each branch of the seat to the surrounding retainer section, seal means between the retainer sections and the cavity wall about each of the passageway openings into the cavity, means maintaining each retainer section in abutment with the cavity wall, a one-piece valve member and stem in the body and cooperable with the seat to control flow through the body, a side door opening into the cavity through which the seat, retainer means and valve member may be inserted and removed, and a cover for the side door maintaining the seat, retainer means and valve member in the cavity.

4. A valve comprising, a body having a cavity therein, at least three passageways interconnecting the cavity and the exterior of the body, a resilient seat in the cavity having a branch communicating with each passageway and conducting fluid between the passageways, seat retainer means provided by separate tubular retainer sections each having an annular flange section abutting the end of a seat branch and the wall of the cavity, said section having a portion extending from the flange portion toward the center of the seat surrounding the seat and providing support therefor, the abutting faces of each seat branch and flange portion of each retainer section having a mating tongue and groove respectively, said tongue of greater width than the groove so as to be under compression to provide seals between the seat and retainer, seal means between the cavity wall and flanges confining flow to the interior of the retainer means, shoulders in the cavity engaging the retainer sections and maintaining them in abutment with the cavity wall, a one-piece valve member and stem in the body cooperable with the seat to control flow therethrough, a side door opening into the cavity through which the seat, retainer means and valve member may be inserted and removed, and a cover for the side door maintaining the seat, retainer means, and valve member in the cavity.

5. A valve comprising, a body having a cavity therein, at least three passageways interconnecting the cavity and the exterior of the body, a resilient seat in the cavity having a branch communicating with each passageway to conduct fluid between the passageways, said seat including arcuately formed sealing surfaces with the interior of the arcs facing and equidistant from a common central axis, each of said surfaces being in the form of a segment of a cylindrical surface, seat retainer means provided by separate tubular retainer sections each having an annular flange portion abutting the end of a seat branch and the wall of the cavity about one of the passageway openings in the cavity, each section having a portion extending from the flange portion toward the center of and surrounding the seat and providing support therefor, the abutting faces of the seat branches and flange portion of the retainer sections having a mating tongue and groove respectively, said tongue of greater width than the groove so as to be under compression to provide seals between the seat and retainer, seal means between the cavity wall and flange portions, shoulders in the cavity engaging the retainer sections and maintaining each retainer section in abutment with the cavity wall, a disc valve member mounted in the body for rotation about said axis and cooperable with the sealing surfaces to control flow therethrough, a side door opening into the cavity through which the seat, retainer means and valve member may be inserted and removed, and a cover for the side door maintaining the seat, retainer means and valve member in the cavity.

6. A valve comprising, a body having a cavity therein, at least three passageways interconnecting the cavity and the exterior of the body, a resilient seat in the cavity having a branch communicating with each passageway and conducting fluid between the passageways, seat retainer means surrounding the seat and abutting the wall of the cavity about each of said passageways, said retainer means distorting the ends of said branches to provide an initial interference between the retainer and branches to seal between each branch of the seat and the retainer means, seal means between the retainer means and the cavity wall about each of the passageway openings into the cavity, a valve member controlling flow through the seat, a side door opening into the cavity through which the seat, retainer means and valve member may be inserted and removed, and a cover for the side door maintaining the seat, retainer means, and valve member in the cavity.

7. A valve comprising a body having a cavity therein, at least three passageways interconnecting the cavity and the exterior of the body, a resilient seat in the cavity having a branch portion communicating with each passageway and conducting fluid between the passageways, said seat including a land between each adjacent pair of branches of the seat, each land being arcuate in planes normal to the direction of flow past the land between the adjacent passageways, one of such planes intermediate the ends of each land intersecting one of such planes intermediate the ends of each of the other lands along a common line and the surfaces of the lands in each of said intersecting planes being closer to said common line than elsewhere on the land, said lands all meeting each other at each of their opposite ends and surrounding said common line, and a valve member journaled on said line as an axis and having arcuate seating edges spaced to engage two such lands at a time and of a dimension to slightly indent each land throughout its length when it engages the land in one of said planes intersecting along said common line.

8. A valve as set forth in claim 7 in which the valve body is a one-piece body.

9. A valve as set forth in claim 7 in which the arcuate surface of each of said lands is cylindrical.

10. As a subcombination, a seat insert for a valve having at least three ways comprising, a resilient body, at least three fluid outlets from said body communicating with each other interiorly of said body, said body being formed with a land between each adjacent pair of said outlets interiorly of the body, each land being arcuate in planes normal to the direction of flow past the land between the adjacent outlets, one of said planes intermediate the ends of each land intersecting one of said planes intermediate the ends of each of the other lands along a common line and the surfaces of the lands in each of said planes being closer to said common line than elsewhere on the land, said lands all meeting each other at each of their opposite extremities and surrounding said common line.

References Cited in the file of this patent

UNITED STATES PATENTS

| | | |
|---|---|---|
| 1,827,266 | Shipley | Oct. 13, 1931 |
| 2,728,550 | Sinkler | Dec. 27, 1955 |